US007610367B2

(12) United States Patent
Canright et al.

(10) Patent No.: US 7,610,367 B2
(45) Date of Patent: Oct. 27, 2009

(54) METHOD FOR MANAGING NETWORKS BY ANALYZING CONNECTIVITY

(75) Inventors: George Canright, Oslo (NO); Kenth Engo-Monsen, Tonsberg (NO); Asmund Weltzien, Oslo (NO)

(73) Assignee: Telenor ASA, Fornebu (NO)

( * ) Notice: Subject to any disclaimer, the term of this patent is extended or adjusted under 35 U.S.C. 154(b) by 0 days.

(21) Appl. No.: 10/585,039

(22) PCT Filed: Dec. 29, 2004

(86) PCT No.: PCT/NO2004/000404

§ 371 (c)(1),
(2), (4) Date: Aug. 29, 2006

(87) PCT Pub. No.: WO2005/064850

PCT Pub. Date: Jul. 14, 2005

(65) Prior Publication Data

US 2007/0168533 A1      Jul. 19, 2007

(30) Foreign Application Priority Data

Dec. 30, 2003   (NO)   ................................. 20035852

(51) Int. Cl.
*G06F 15/173*   (2006.01)
(52) U.S. Cl. ..................................................... 709/223
(58) Field of Classification Search ................. 709/223, 709/224, 200
See application file for complete search history.

(56) References Cited

U.S. PATENT DOCUMENTS 6,437,804  B1 *   8/2002   Ibe et al. ...................... 715/736
2005/0033742 A1 *   2/2005   Kamvar et al. .................. 707/7

OTHER PUBLICATIONS

Boyd; "Numerical Methods for Bayesian Ratings from Paired Comparisons"; 1991; Journal of Quantitative Anthropology 3; Kluwer Academic Publishers; pp. 117-133.*
Canright et al; "Roles in Networks"; Jul. 17, 2004; Science of Computer Programming 53; pp. 195-214.*
Satorras et al; "Epidemic Spreading in Scale-Free Networks"; Apr. 2, 2001; Physical Review Letters, vol. 86, No. 14; The American Physical Society; pp. 3200-3203.*

(Continued)

*Primary Examiner*—Andrew Caldwell
*Assistant Examiner*—Jeffrey Nickerson
(74) *Attorney, Agent, or Firm*—Schneck & Schneck; Thomas Schneck

(57) ABSTRACT

A method is capable of being used for determining an ability of a network to spread information or physical traffic. The network includes network nodes interconnected by links. The method comprises steps of: mapping a topology of the network, computing values of link strength between the nodes, computing an eigenvector centrality index for all nodes, and based on examining the eigenvector centrality of all neighboring nodes of each node, identifying nodes which are local maxima of the eigenvector centrality index as centre nodes, grouping the nodes into regions surrounding each identified centre node, assigning a role to each node from its position in a region, as centre nodes, region member nodes, border nodes, bridge nodes, dangler nodes, and measuring the susceptibility of the network to spreading, based on the number of regions, their size, and how they are connected.

1 Claim, 7 Drawing Sheets

OTHER PUBLICATIONS

Borgatti, Stephen; "Centrality and Network Flow"; Feb. 17, 2002; Sunbelt International Social Networks Conference; pp. 55-71.*

Cheng, Yizong; "Mean Shift, Mode Seeking, and Clustering"; IEEE Transactions on Pattern Analysis and Machine Intelligence, vol. 17, No. 8; Aug. 1995; pp. 790-799.*

Girvan et al; "Community Structure in Social and Biological Networks"; Proceedings of the National Academy of Sciences, vol. 99, No. 12; Jun. 11, 2002; pp. 7821-7826.*

Hanneman, Robert; "Introduction to Social Network Methods"; 2001; Self-published; Retrieved via http://facultydirectory.ucr.edu/cgi-bin/pub/public_individual.pl?faculty=311 on Mar. 24, 2008; pp. 1-149.*

Hader et al; "Efficient density clustering using basin spanning trees"; 2003; Proceedings of 26 Annual Conference of the Gesellschaft für Klassifikation (GfKI); pp. 39-48 (1-9 extracted pub.).*

* cited by examiner

METHOD FOR MANAGING NETWORKS BY ANALYZING CONNECTIVITY

FIELD OF THE INVENTION

The present invention refers to a set of methods for managing networks (both logical and physical networks), within a number of areas. More particularly the present invention discloses a method for analyzing a network, where the network consists of any number of network nodes connected by links.

BACKGROUND OF THE INVENTION

Almost any social or physical structure where individual entities are linked together by some sort of relationship can be analyzed from a network perspective, be it social groups, airway routes, or groups of computers. Networks are interesting objects. They have a great deal of structure, and yet at the same time are simple: they consist, in simplest form, only of nodes, connected by links. The abstract idea of a network, or graph—the term is used interchangeably—is also highly useful in modelling structures observed in the real world. Examples include: social networks, communications networks, the World Wide Web, metabolic and genetic networks in biological systems, food webs, disease networks, and power networks. In short, a network is a simple, nontrivial abstract structure, fascinating in its own right, and also highly relevant for many branches of science and technology.

Within the area of telecommunications, theories regarding network management and network structures have been established for a long time. It is of crucial importance to understand a network. The efficiency of operation and maintenance of such a telecommunication network will largely rely on knowledge of the network in question. It is important both with respect to mean time between failure, as well as with respect to the spreading of damage, such as viruses, worms or the like.

For data communication networks the situation is much the same. Similar considerations are relevant for operation of electric power networks, particularly with respect to safety. Within planning and operation of electric network it is important to have a robust network, thus for example avoiding situations where a large part of a population is exposed to power outage. Analysis of the connectivity of a network is important for robustness considerations.

System administration invariably involves managing a network, which is composed of multiple types of links. Examples include: the physical links between the machines, the logical links between users and files, and the social links between users. An important aspect of system administration is to ensure the free flow of needed information over the network, while at the same time inhibiting the flow of harmful or damaging information, over this same network.

The structure of the network plays a crucial role in the implementing of these two important, and partly conflicting, goals of system administration. Both goals involve the spreading of information over links of the network; hence both problems are strongly sensitive to the network structure. Because of this dependence, the understanding of network structure can be a valuable component of effective system administration.

Furthermore, there are of course those networks that are both social and technological. Examples include telephony networks; peer-to-peer networks [10] overlaid on the Internet; and the combined network of computers, files, and users that is the daily preoccupation of every system administrator.

Here, once again, security seems an obvious application for these ideas: one wishes to identify nodes that should be given highest priority in protecting against viruses, for example.

Studies of networks have received a great deal of attention in the last decade or so. Most of the measures of network structure that have been studied to date [8] take the form of 'whole-graph' properties, that is, scalar measures or distributions which apply to the graph as a whole, and are calculated using averaging. Examples of such whole-graph properties include the node degree distribution, the diameter or average path length, clustering coefficients, and the notion of 'small worlds', which is based on the previous two.

Whole-graph properties are important and useful; however they cannot give a complete answer to the question, "How can we understand the structure of a network?"

There exist many examples where knowledge of networks, which take a more abstract form than those of telecom, datacom, or electrical networks, is of importance. For example, in the field of epidemiology, it is important to have an understanding of social networks and how these networks facilitate the spread of diseases. Within information distribution it is of importance to know the mechanisms governing the spreading of information within a population, be it on a local or global level.

When looking at inter human relationships or social networks one pays attention to the links between the individuals rather than their categories or what characterizes them. A social network is thus any group of persons where the individuals have some sort of relation to each other. Persons with a high degree of social influence in social networks are often labeled opinion leaders. They are influential either by virtue of their expertise or by virtue of their social position. In any case this influence often manifests itself by giving the opinion leaders a great number of social contacts; they are linked with a high number of people. This is of course logical; to have social influence means that you have the ability to reach a high number of people.

The utility of this idea for social networks seems clear [4]. It is also obviously of interest to identify communities in a measured social network. An example with a slightly different flavour is the network of sexual contacts. Here too these ideas may be quite useful, in work addressed at limiting the spread of sexually transmitted diseases: perhaps one would focus on the two complementary goals of (i) preventing infection of the central nodes of each community, and (ii) preventing the transmission of the disease across the bridging nodes.

For these reasons, networks merit serious study. A network is one of the simplest abstractions of structure that can be studied; yet, understanding the structure of a network is a nontrivial undertaking.

PRIOR ART

In the scientific field of network analysis, there are several ways to measure the centrality of network nodes. One of these measures is termed eigenvector centrality. Eigenvector centrality (EVC) was defined in the early seventies by Bonacich [2]. The basic idea behind EVC is, it's not only how many people you know, but also how important (central) they are, that determines how important (central) you are. This is thus actually a recursive definition: my importance (centrality) depends on my neighbors'—which in turn depends on mine. The point of such a recursive definition is to allow us to identify those hubs that are really influential from the perspective of the whole network. Otherwise a definition that counted importance only by how many neighbors you have would run the risk of nominating the centers of isolated clusters as network hubs. With respect to social networks these centers are only influential in a limited sense, since their influence does not extend beyond their immediate neighbors.

The work of Kleinberg [7], while addressed to networks with directed links, provides some useful perspective. Kleinberg considered a directed graph, defined two distinct types of roles for the nodes on the graph, and gave a way to calculate indices which quantify the degree to which each node plays the two types of role. That is, each node in a directed graph may be assigned an Authority score and a Hub score. It is important to note that these scores can be based solely on the topology of the graph-independent of any questions of content or meaning, or of any 'properties' of the nodes.

The names of these two role types convey their meaning. Nodes with high Authority are nodes which are important because they are pointed to by important nodes—in fact, by nodes with high Hub scores. And the latter obtain their high Hub scores by pointing to good Authority nodes. In short: Hubs point, and Authorities are pointed to. These ideas can be highly useful in analyzing the structure of the WWW: Authorities are likely good endpoints of an information search, while Hubs are useful in leading the search to the Authorities. It seems clear that similar roles arise in social networks: sometimes, one knows who has the needed information (the Authority); other times, one needs to ask a good Hub.

Kleinberg's work gives us indices for each node in the network. These indices tell us useful information about the role(s) the node plays in the network. Such information is quite distinct from whole-graph information; and yet it is still derived, at least as originally presented, purely from the topological structure of the graph.

Another aspect of a graph, which is again distinct from whole-graph properties, is the community structure of the graph. In the same paper, Kleinberg suggested a way to find such communities in graphs such as the Web graph. The mathematical tools used are basically the same as those used to find Hub/Authority scores—which means, among other things, that the decomposition of the graph into communities was also based purely on the structure of the graph, without invoking any knowledge or properties of the nodes or links. Furthermore, it can be noted that decomposing a graph into sub communities provides new information about the roles played by nodes: they may be members of community X; they may happen to lie in no community; they may be 'leaders' in some sense of their community, or they may lie on the 'edge'; and they may play an important role in linking multiple communities.

Many other works have addressed the same problem of how to find 'natural' communities in a directed graph such as the Web. In contrast, Girvan and Newman [5] have looked at this question for undirected graphs. Their basic approach is to define communities by first finding their 'boundaries'—specifically, by finding links with high 'betweenness', which, when removed, break the graph into sub communities.

SUMMARY OF THE INVENTION

It is an object of the present invention to provide a method for network analysis, to be applied either to physical networks, or to logical networks which exist as overlay networks on top of the physical network. The important common aspect is the identification of links (physical or logical), over which information can flow.

Another object of the present invention is to provide a 'natural' means—that is, one based solely on the graph topology—for decomposing an undirected graph into communities. A set of roles for the nodes of the graph will be defined, such that each node is assigned one, and only one, role. That is, unlike the approach of Kleinberg, for the present application it is desirable that the roles are binary (Yes/No) properties of nodes-and exclusive as well.

Prior art [13, 3] has shown in more detail how to apply the analysis presented here to networked computers with many users. The present invention provides a natural way of decomposing a network into well-connected clusters, and of assigning meaningful roles in information flow to each node in the network.

These objects are achieved in a method for network analysis as disclosed in the appended claim 1. In particular, the present invention provides a method for analyzing the ability of a network to spread information or physical traffic, said network including a number of network nodes interconnected by links, said method including the steps of mapping the topology of a network, computing a value for link strength between the nodes, computing an Eigenvector Centrality index for all nodes, based on said link strength values identifying nodes which are local maxima of the Eigenvector Centrality index as centre nodes, grouping the nodes into regions surrounding each identified centre node, assigning a role to each node from its position in a region, as centre nodes, region member nodes, border nodes, bridge nodes, dangler nodes, measuring the susceptibility of the network to spreading, based on the number of regions, their size, and how they are connected.

Advantageous embodiments of the invention appear from the following dependent claims.

BRIEF DESCRIPTION OF FIGURES

In order to make the invention more readily understandable, the invention will now be discussed in detail in reference to the accompanying figures, in which.

DETAILED DESCRIPTION OF THE INVENTION

Figure 1:
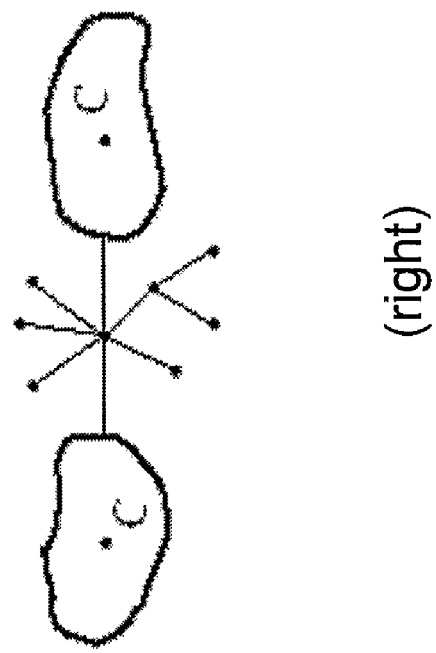
FIG. 1 is a schematic diagram showing a Bridge Node (left) and Bridge Node and Danglers (right).
Figure 1:
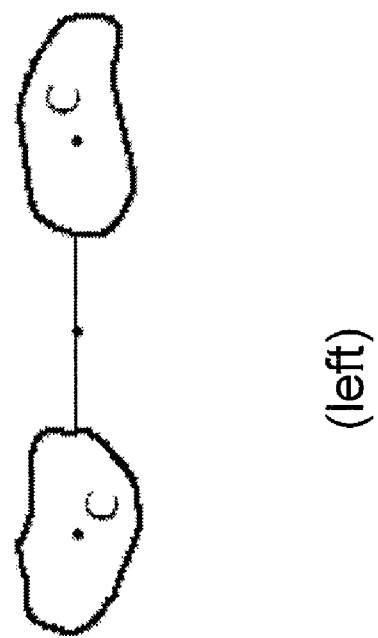

Useful and interesting applications of ideas of network analysis are disclosed by the present invention. The only prerequisite is that the links of the networks are undirected. By undirected links we mean links that do not point in a specific direction. On the World Wide Web a web-page may point to another, but this page does not necessarily have to point back. In this instance the pages would be connected by a directed link. If both pages were hyper-linked to each other, one link going in each direction, these links could be collapsed into one, undirected link. The present invention treats all networks as consisting of undirected links.

The idea pursued by the present application is that 'well-connectedness' may be viewed as a height function over the discrete space (the graph). If the height function of the present invention is smooth enough, ideas appropriate for smooth surfaces over a continuous space can be employed. That is, the present invention will use a topographical picture to define regions in a network. Regions will correspond to 'mountains', with the centre of each region being the corresponding mountaintop. Boundaries between regions will then be defined as those points failing to be uniquely associated with one mountain region.

The defined roles are: 'leader' of a community (region); member of a community; and two types of roles for nodes in the 'border set', i.e., nodes not belonging to any community.

The approach taken is roughly dual to that of Girvan and Newman [5]. The present invention begins, not with the 'edges', but with the 'centres' of the communities. From this starting point, one works 'outwards' to find the members, and finally the border nodes. The presented set of roles is complete and consistent, in the sense that the definitions allow a unique and unambiguous association of a single role to each node in the graph.

EMBODIMENT OF THE PRESENT INVENTION

People that communicate with each other form a social network, where the links are based on their communication. These links may be distinguished according to the type of medium that is being used, be it telephony, face-to-face communications, or mail. Thus, the social network can be described as multiplex: it is a network where the nodes are related to each other by different types of links. Although the social relationships that link different persons together may exist independent of the type of medium used, the type of medium plays an important role in defining the links, as each medium is a distinct channel for information flow. Different communications media are in this sense analogous to languages. For example, a person that wants to reach many nodes in the network has to be able to communicate over multiple types of media—he has to speak the other nodes' preferred 'language'. This idea of links differentiated by media is valid for most kinds of networks: Disease may for example spread through a number of different carriers of infections, and the links in transportation networks may consist of many different means for transportation, for example cars, planes, or trains.

Link Strength and EVC Measures

The strength of the links in this type of multiplex network can be determined in different ways. Here we mention four:
1) One can simply state whether a link (of any type) exists or not. Numerically, one assigns 0 to 'no link' and 1 to 'some link'.
2) One can count the number of different media that connect any pair of nodes, that is, the number of different media that has any flow of substances or information between any two nodes in the network.
3) One can measure the total flow between any two nodes in the network. To do this one must convert the data that is available to a common measure. This measure thus gives the net amount of flow (for example minutes or words for communications media) between any two nodes in the network.
4) A fourth alternative is to determine the strength of the links through a mixture of 2) and 3). That is, count each medium [as in 2)], but weighted [as in 3)] by the fraction of flow for that medium, that a given pair uses.

The traditional way of determining link strengths is indicated as number 1). Method 3) is also known. Methods 2) and 4 are new and innovative methods for determination of link strengths.

The eigenvector centrality (EVC) index is mathematically defined as the principal eigenvector of a matrix. The simplest and most common method for finding the principal eigenvector of a matrix is the 'Power Method' [14]. This method involves repeated multiplication on a vector of weights by the matrix. Multiplication on the weight vector by the matrix is equivalent to what can be called 'weight propagation': it redistributes a set of weights according to a rule. Repeated redistribution of the weights (with overall normalization of the total weight) yields a steady distribution, which is the dominant or principal eigenvector. These are the scores, which are used as centrality index by the present invention.

Figure 7:
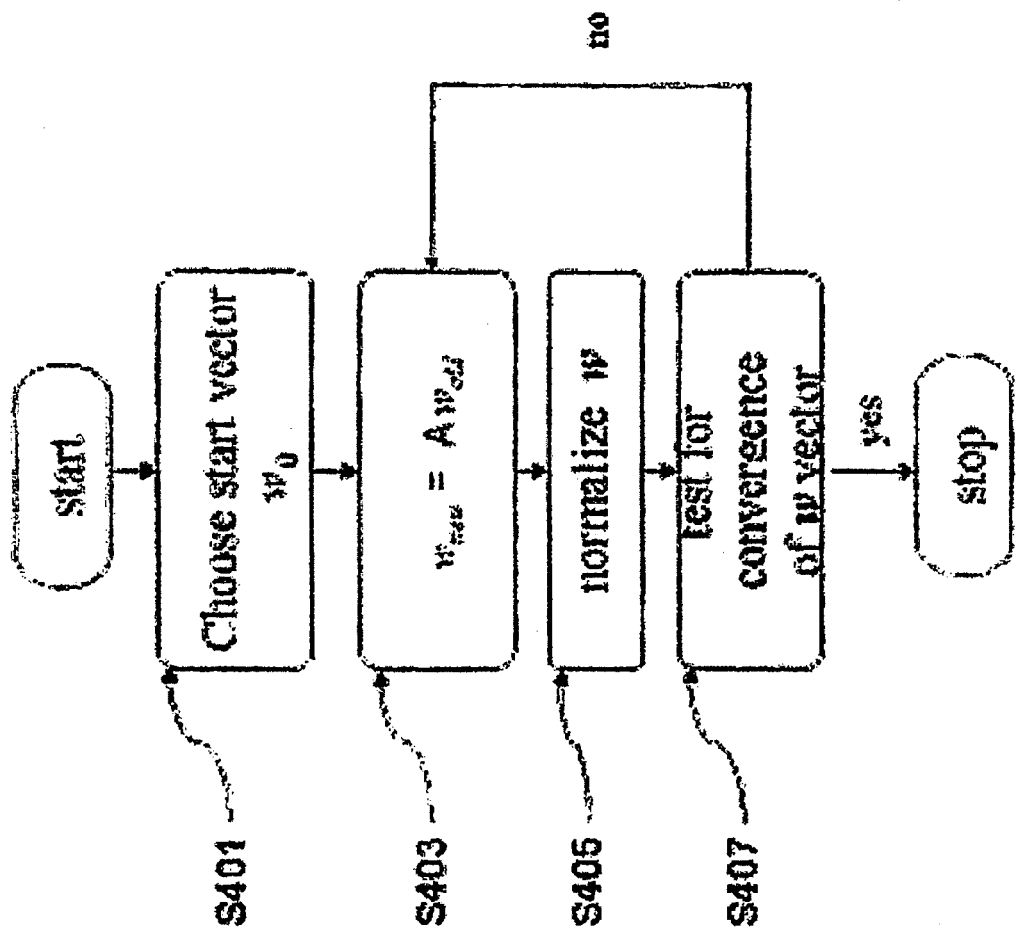
FIG. 7 is a flow diagram illustrating the method used for calculating the Eigenvector Centrality index.

For clarity, we illustrate the application of the Power Method, in FIG. 7. Here, using the equations explained previously, the process starts and a start vector w0 is chosen (S401). At each iteration, a new weight $w_{new}$ is calculated (S403) by redistributing the weights according to the action of the matrix operator. This new weight is then normalized (S405). A convergence test is then performed (S407). If the weight has converged, the process ends. Otherwise, a new weight is calculated and process repeats until the weight converges.

For the analysis of multiplex social networks, the EVC measure has been generalized to incorporate three other measures of link strength (2-4), as mentioned above. The modification of the general EVC idea, as applied in the new methods 2) and 4), is as follows: a node is central if it has many neighbors with high centrality—and uses many different types of media. In the following it is described how to implement this general idea for each of the four approaches to link strength discussed above:
1) The traditional approach, in which the adjacency matrix $\underline{\underline{A}}$ is composed only of 0's and 1's, could be used with multiplex networks; but it is totally insensitive to the number of media used by each pair of nodes.
2) Here we simply replace the matrix $\underline{\underline{A}}$, whose entries are all either 0 or 1, with the matrix $\underline{\underline{A}}_{color}$, defined as follows: the entry $(\underline{\underline{A}}_{color})_{ij}$ is equal to the number of 'colours' (distinct media) connecting nodes i and j.
3) Here the 1's in the traditional $\underline{\underline{A}}$ matrix are replaced by a positive real number, giving the total volume of flow (summed over all media, and measured in a common unit of measure) over some given time interval. That is:

$$(\underline{\underline{A}}_{volume})_{ij} = \sum_c V_{c,ij},$$

where c is an index ranging over 'colours' (media), and $V_{c,ij}$ is the total communications volume in medium c between nodes i and j.
4) Finally the present invention proposes a mixture of approaches 2) and 3), so as to give weight both to flow volume and to the existence of multiple media. Hence, for each medium c and node pair ij, we give a 'score' which is the fraction (contributed by the pair ij) of the total communication that uses medium c in the network. Let $V_{T,c}$ denote the total volume (over the entire network) of communication using medium c. Then our 'mixed' measured of link strength may be written as $$(\underline{\underline{A}}_{mixed})_{ij} = \sum_c (V_{c,ij}/V_{T,c}).$$

The method according to the present invention converts flow data into an adjacency matrix, using one of the four methods described above to give each matrix entry a link strength measure. It then calculates the principal eigenvector of the resulting modified adjacency matrix. This allows us to assign an index (a positive number) to all the nodes in the network, giving their centrality according to one of our four measures. Those nodes with the highest centrality values are viewed as the most central nodes in the network. This allows the method to produce a list of the network hubs and their immediate neighborhoods. The centrality index also makes it possible to produce a topographical map of the network structure, that is, a graphical visualization of the network that shows the most central nodes as local 'peaks'.

Roles in Networks

The final goal of the present invention is to assign a natural and unique role to each node in the network, based solely on the topology of the graph. As noted above, Kleinberg found two such roles for directed graphs: Hubs and Authorities. Hubs are naturally good at pointing to good Authorities; and Authorities are naturally good at being pointed to by good Hubs. One can see already from these simple grammatical statements that the distinction between Hubs and Authorities vanishes when the arcs of the graph become undirected (so that "pointing to"="being pointed at"). The mathematics gives the same result: for the undirected case, the adjacency matrix is symmetric, $A=A_T$, and so the matrices defining Hubs and Authorities become the same.

In short, for undirected graphs, the two types of roles collapse to one. That one role (more precisely, an index quantifying the degree to which the node plays the role) is eigenvector centrality.

The Hub operator $AA^T$ and the Authority operator $A^TA$ simply becomes $A^2$, whose principal eigenvector is the same as that for A.

Hence it is found that two of the roles identified in Kleinberg's work with directed graphs becomes a single (type of) role for an undirected graph. This role type is called well-connectedness in the following sections, or eigenvector centrality. It is further searched for distinctions among the nodes of an undirected graph-in other words, multiple distinct roles, to which any given node may be assigned. These roles will be defined in the next section. Eigenvector centrality (EVC) will be the height function, and hence the starting point.

Definitions of the Roles

The difference between 'role type' and 'role' has to be clarified. Realvalued indices or 'scores' can be associated with each node: Hub and Authority scores for the directed case, and EVC score for the undirected case. These are role types; in fact it is fair to say that all three scores represent some type of centrality. All nodes have some degree of centrality; and 'being central' is certainly a type of role. By role however in this document it is meant a binary (yes/no) distinction applied to each node, so that each node receives a single Yes and hence is assigned a unique and unambiguous role. Centrality (a role type) will give a smooth height function over the graph, allowing the use of topographic criteria to assign a (Yes or No) role to each node.

Centres

For simplicity and readability the picture of mountains, valleys, saddles etc for the height function is kept. Each mountain may be defined by its peak. The peak is a local maximum of the height function. The first role is then the mountain peak.

Centre: any node which is a local maximum of the eigenvector centrality is a Centre.

Regions

Each mountain top defines a mountain. Hence the number of Regions in the graph is equal to the number of centres. (Henceforth, except when roles are defined, the capital letters is dropped; the meaning should be clear from context.) Regions are usually composed of more than one node; hence the role for a node cannot be a region, but rather a Region Member.

Region Member: each node that may be uniquely associated with a single Centre, according to an unambiguous rule, is a member of that Centre's Region, and hence a Region Member.

It remains to specify the "unambiguous rule". According to the present invention, two possible choices are given for the "unambiguous rule".

Rule 1 (distance). A node is associated with Centre C if it is closer (in number of shortest path hops) to C than to any other Centre $C_0$.

Rule 2 (steepest ascent). For each node i, a steepest-ascent path starting at i will terminate at one (or more) Centres. If it terminates at a single Centre, then node i is associated with that Centre.

These rules are simply the discrete-domain version of the process of associating a part of the domain (base space) with each mountain top-hence defining each mountain. One must be careful here to break the definition of region into two parts: the definition itself, which refers to a rule but does not specify it; and the rule. This is done because more than one rule is possible for the discrete case; and the region definition in a way that captures the "mountain" idea is stated, but leaves the rule unspecified.

Both rules stated above satisfy the intuitively reasonable criterion that a centre's near neighbours should (in general) belong to its region. (It is, after all, the number and connectedness of a centre's neighbours that gives that centre its high EVC.) Both rules are also easy to implement in a simple iterative fashion-starting with the centres, and working outwards from them, "coloring" nodes according to the regions (centres) they belong to. The steepestascent rule is however the rule which is the most faithful to the topographic picture.

Borders—between Regions

On a continuous topographic surface there are points which lie between mountains, and belong to no unique mountain. It may happen that analogous points exist for the discrete case as well.

Nodes which cannot be associated with any one mountain are assigned to the Border set.

Border Nodes: any node for which the unambiguous rule for Region membership gives more than one answer is a Border Node.

Intuitively, one thinks of border nodes as "connecting regions". And yet, a bit more thought reveals that not all border nodes are equal in this regard. Some border nodes do indeed play an important role in connecting two or more regions: they lie on paths which connect the respective centres (hence regions). See left panel of FIG. 1. Other nodes may be removed, without any loss in the degree of connection between the regions. See right panel of FIG. 1. Hence it is natural to define two distinct roles to the set of border nodes.

Bridge Node: a Border Node which lies on at least one nonself-retracing path connecting two Centres is a Bridge Node.

Dangler: any Border Node which is not a Bridge Node is a Dangler.

Danglers of course may inject new information into the network; but they do not play a significant role in the transport of information between regions.

Finally, it is desirable to single out a class of links which play an important role in connecting regions. The reason for doing so here is that the border set for the steepest-ascent rule is in general very small or zero. In this case it is still useful to highlight those network elements which connect the regions. Hence it is defined: Bridge Links: any link whose endpoints lie in two distinct Regions is a Bridge Link.

Bridge links will occur for either region rule above. One can imagine rules for defining regions which give 'fat' borders. For example, one could associate nodes with centres according to:

Rule 1' (distance with cut-off). A node is associated with Centre C if it is closer (in number of hops) to C than to any other Centre $C_0$, and if its distance from C is not greater than h hops.

'Fat' borders arise for such a rule since there could be many nodes which are farther than h hops from any centre. In general, 'fat' boundaries arise if one chooses a rule designed to avoid the 'growing together' of regions from their respective centres. Distance to which growth is allowed could then be measured in hops (as in Rule 1'), or in decrements in EVC.

Boundaries according to Rule 1 are 'thin': essentially one node wide. Boundaries according to Rule 2 are even thinner: in general, they are 0 nodes wide, since it is rare that a node will have two or more steepest-ascent paths, leading to different local maxima.

The Mathematics

The mathematical problems as solved by the present invention are solved focusing on 'smooth' functions over a discrete space.

Suppose the domain space is continuous. Then harmonic functions are the smoothest functions available. These functions are solutions to Laplace's equation, $$\nabla^2 \phi = 0 \quad (1)$$

For a given space, one obtains different solutions to (1) from differing boundary conditions on $\phi$.

One will immediately identify some problems with the continuum picture. One problem is that there are no maxima, or minima, away from the boundary. Hence the topographic picture according to the present invention cannot work with such smooth functions: every mountaintop will lie on the boundary. Furthermore, the present invention is disclosing a natural way of defining regions. Here "natural" means, guided as much as possible by the topology of the graph. Hence it is undesirable to have to assign values for the function $\phi$ at the boundary—it will be preferred that the topology solve this problem.

One can of course solve this last problem by setting $\phi$=constant, for example, zero, at the boundary. That is, the boundary is just given some nominal reference value. This is "natural" enough; however one then get that $\phi$=constant over the entire space, due to the averaging property of Laplace's equation.

The discrete version of Laplace's equation is $$L\phi = 0 \quad (2)$$

where L=K−A is the Laplacian matrix, K=Diag($k_1$, $k_2$...) is a diagonal matrix whose ith entry is the node degree $k_i$, where $k_i$ is the number of connected neighbours of node i, and A is the adjacency matrix, with $A_{ij}$=1 if there is a link from i to j, and 0 otherwise.

It is easy to see that the averaging property holds here also: solutions to (2) obey $$\phi_i = \frac{1}{k_i} \sum_{j=nn(i)} \phi_j \quad (3)$$

Here "nn" means "near neighbour". The discrete Laplace equation thus offers 'most smooth' functions for the discrete case; but it has all the problems seen for continuous harmonic functions, plus one more. The additional problem stems from the crucial fact that the specification of the boundary of a discrete space is not unique—in fact, there is no natural way to define such a boundary. One can of course take the, perhaps least arbitrary, assumption that none of the points are boundary points—all have to have their height determined by the graph structure—but then one gets back the constant $\phi_i$=constant.

Eigenvector Centrality

Following the discussion from the expression (3). A small change in the picture as given by (3) solves all of its problems at once. The small change is as follows: it is asked for a height function which obeys, instead of the averaging property (3), the following:

$$\phi_i = \frac{1}{\lambda} \sum_{j=nn(i)} \phi_j \quad (4)$$

That is, instead of taking the strict average over all neighbours, one divides the neighbour sum by a constant $\lambda$, which is the same for all nodes. This equation can be written as $$A\phi = \lambda\phi \quad (5)$$

where A is again the adjacency matrix. Now we have an eigenvalue equation, and the height function $\phi$ is an eigenvector of the adjacency matrix. The present invention wants in fact the eigenvector which is the stable iterative solution of (4), because height is supposed to signify 'well-connectedness'. That is, (4) encodes the idea that node i's well-connectedness is determined, to within a scale constant $\lambda$, by that of all of i's neighbours. Iterating this requirement, from any starting point, will give the principal eigenvector of the adjacency matrix. This eigenvector gives the stable, self consistent solution of (4); it also has the property that it is positive semi definite, since A is.

With this one modification, the problems as seen above with Laplace's equation (discrete or otherwise) are no longer present. EVC can have local maxima away from the boundary. In fact, since it measures well-connectedness, local maxima of EVC tend to lie well away from any nodes that one might be tempted to call 'boundary nodes'. Furthermore, there is no need to define a boundary for the discrete case: all nodes may have EVC values determined by Equation (4), with no values input as 'boundary conditions'.

Specifically, the contributions here are:
1) The two new modified forms for the adjacency matrix, giving two new measures of centrality that allow network centers to be picked out.
2) The definition and method for identifying network regions.
3) The definitions and methods for assigning discrete network roles to each node in the network.
4) Applying the new measures of centrality, regions, and roles to a wide variety of applications.

EXAMPLES

In the following is given examples of embodiment of the present invention as well as comparisons between the two rules for defining regions.

Figure 4:
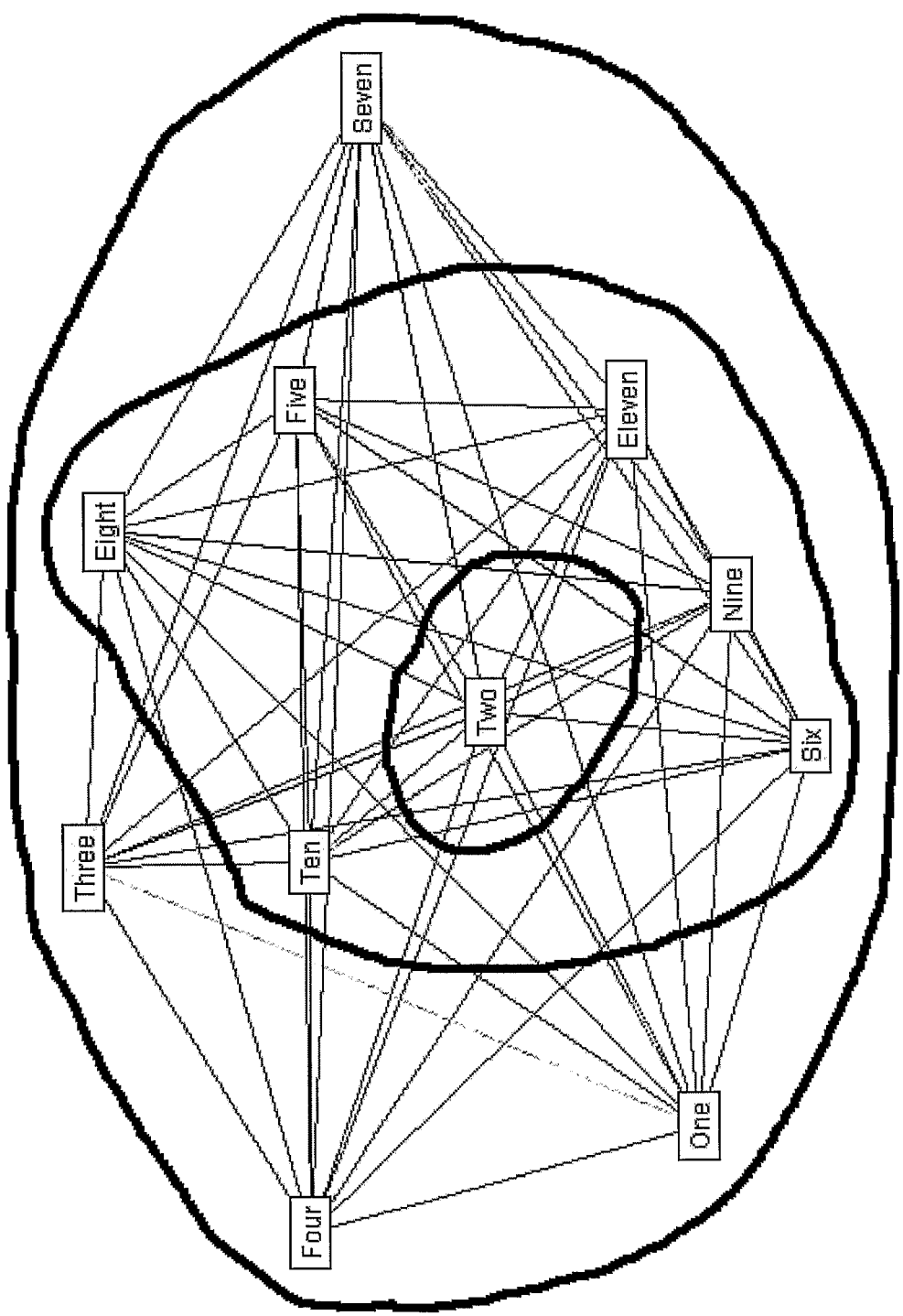
FIGS. 4, 5, and 6 show the resulting graphs of the MANA project [4] using three different measures for link strength.
Figure 5:
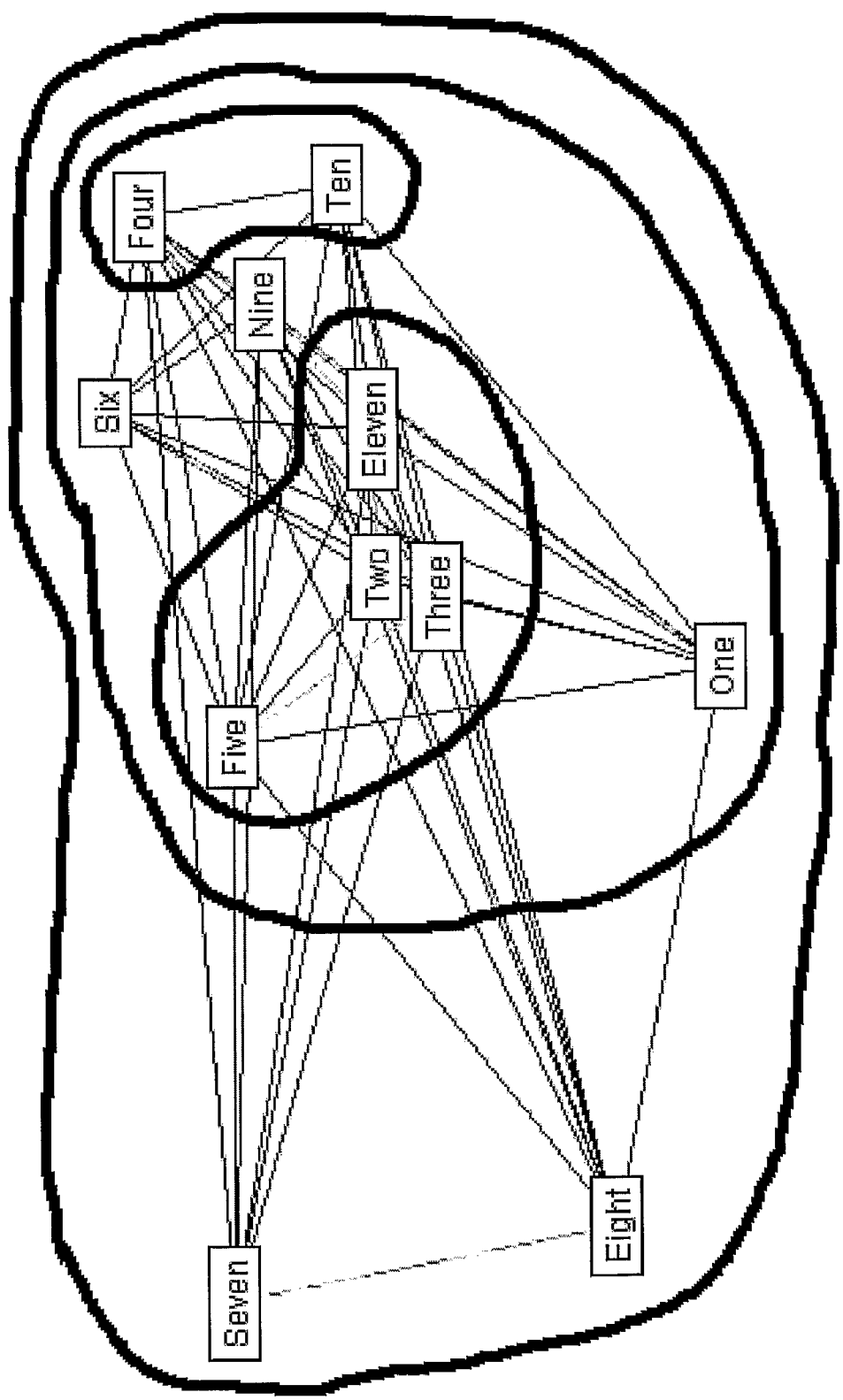
Figure 6:
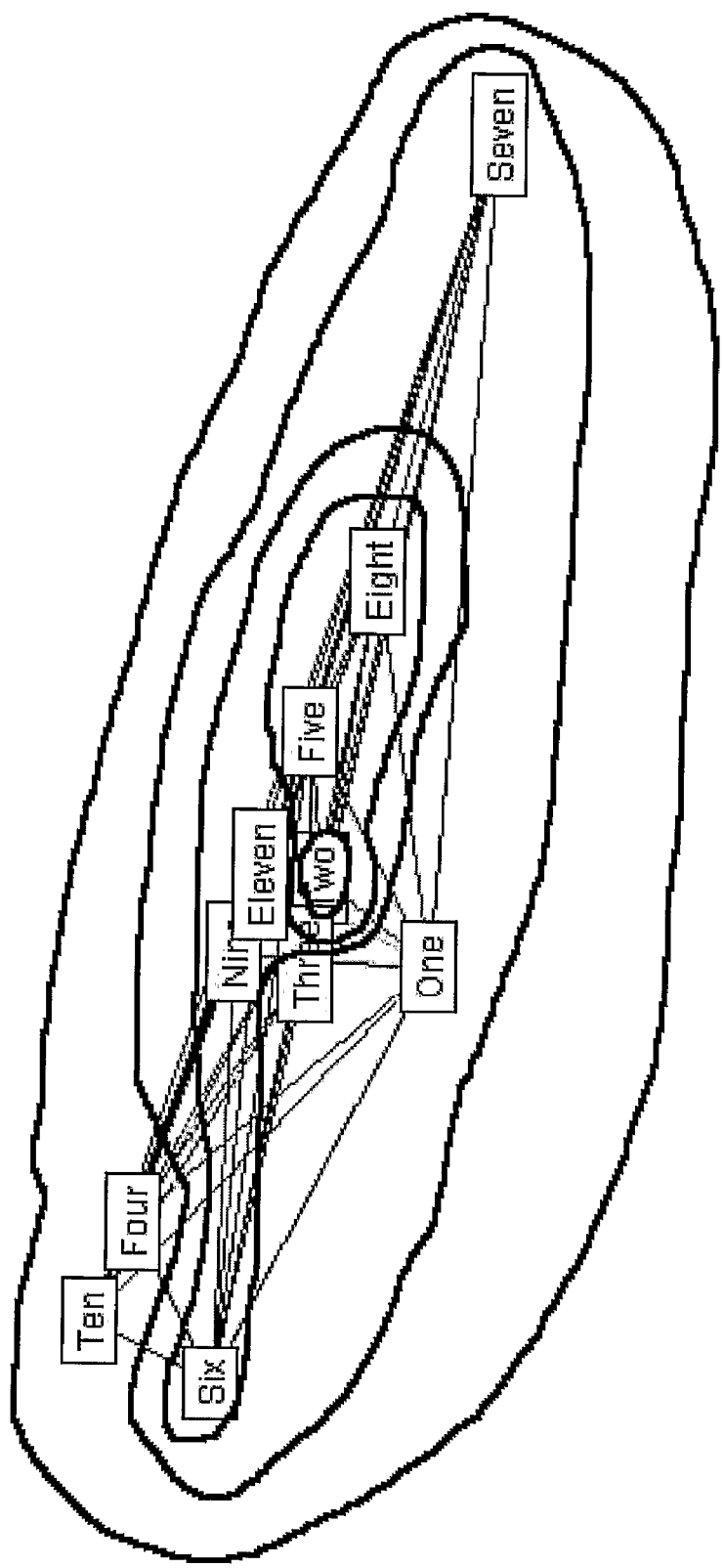

FIGS. 4, 5, and 6 show the results of the MANA research project as presented in [4]. The graphs represent a small social network, a working group of 11 persons. With the use of the presented method's different measures for link strength, EVC-based centrality indices were made for the network. The topographical visualizations show the centrality of the nodes as differences in height. In FIG. 4, link strength is measured based on the number of different media used by each node (method 2). FIG. 5 shows the graph when the link strength is based on the net amount of flow between the nodes (method 3). Finally, FIG. 6 shows the graph that is based on a mixture of the above methods for determining link strength, that is, both the number of media used and the net amount of flow (method 4).

Figure 2:
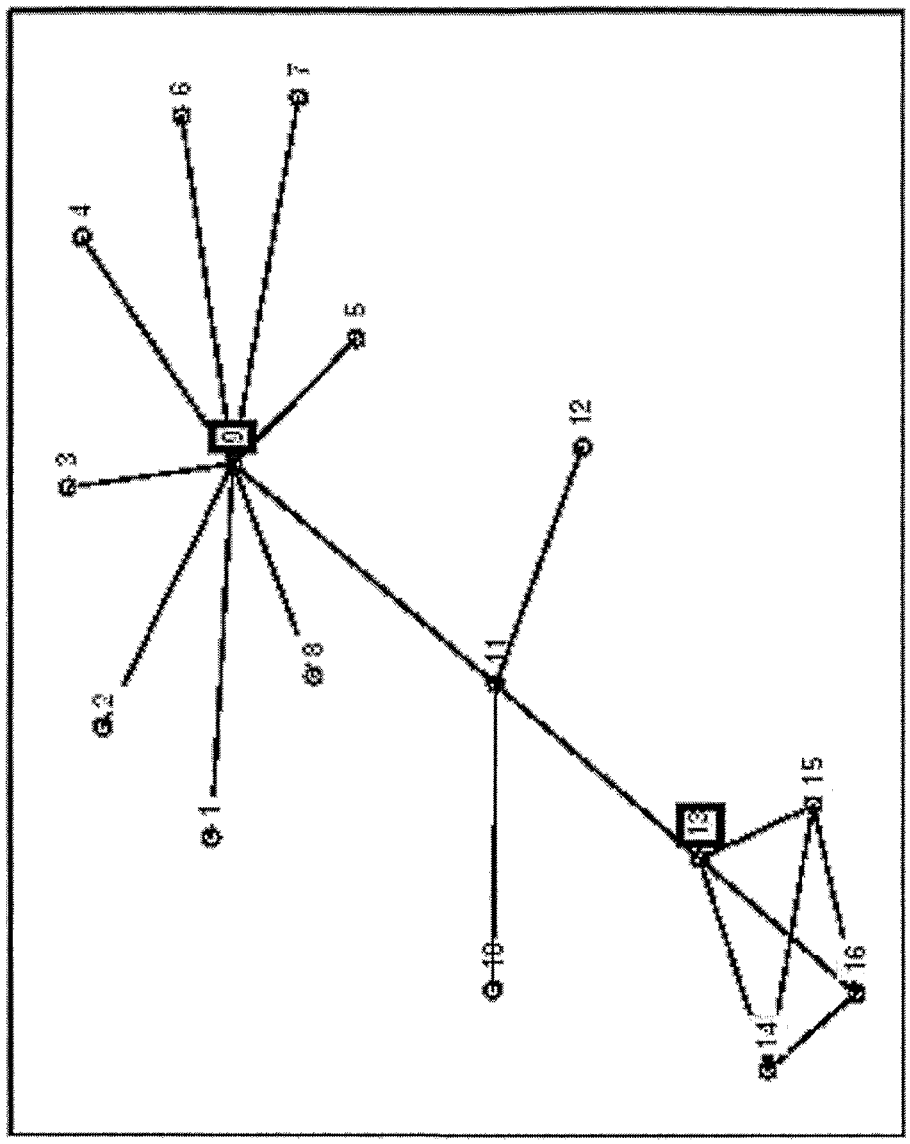
FIG. 2 shows a simple graph with two regions.

FIG. 2 shows a simple graph with two centres. The Border consists of three nodes. One (node 11) is a bridge node which clearly plays an essential role in connecting the two regions, the other two are danglers.

Figure 3:
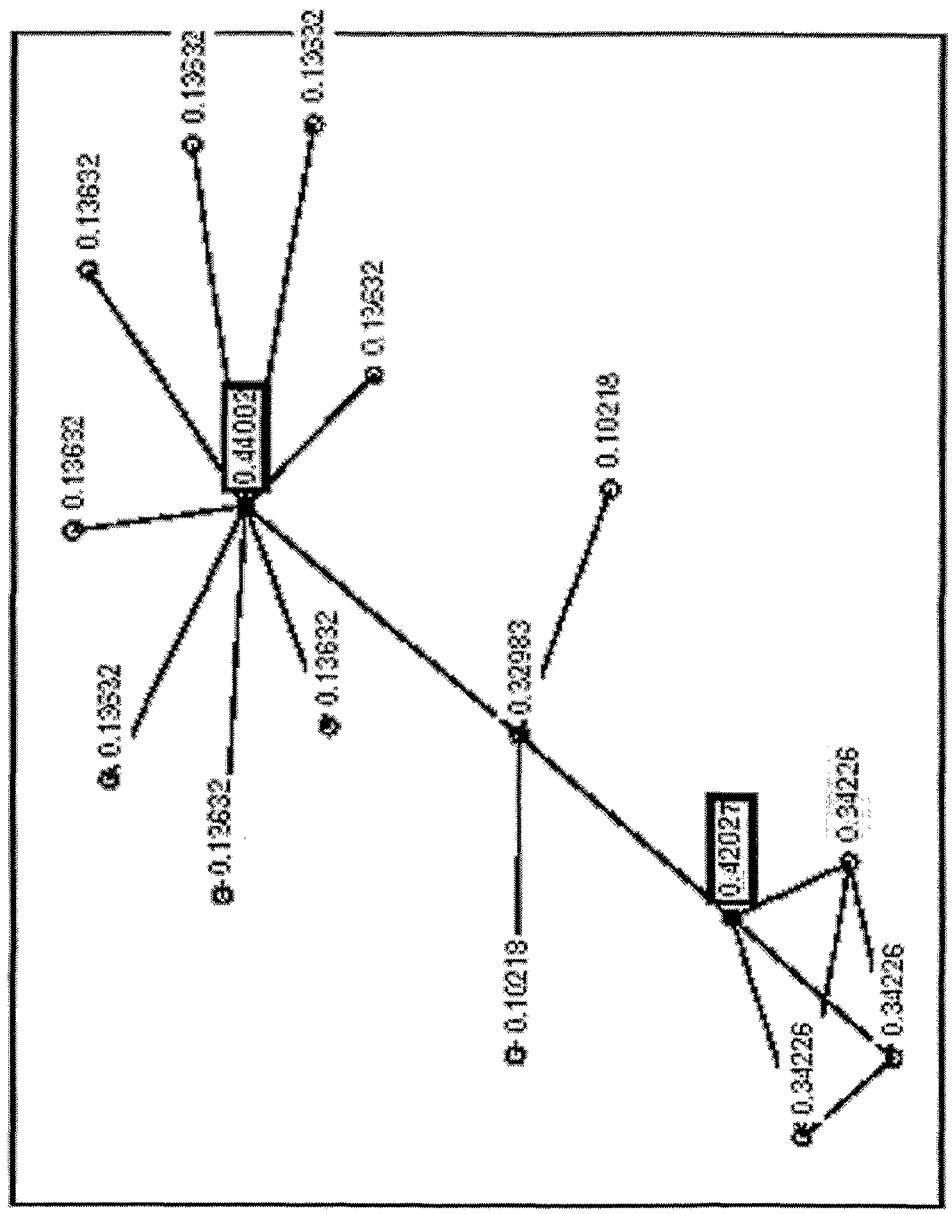
FIG. 3 shows the same graph as in FIG. 2, but with the regions defined using another rule. EVC values for the nodes are also shown.

Applying Rule 2 to the same graph gives us FIG. 3. Here one can see that the entire border has been 'swallowed' by the dominant centre (node 9). The rather peripheral role of nodes 10 and 12—formerly classified as danglers—is now reflected in their distance (2 hops) from their centre (and of course in their low EVC).

Comparing these two figures thus confirms the expectations about the differences between the two rules: a border set, with or without danglers, is typically present with Rule 1, but absent with Rule 2.

To illustrate the application of these ideas, we suppose that the nodes in FIGS. 2 and 3 are users in a computer network, while the links are effective connections between users which allow information flow. Here the term 'effective' connections is used, because the links may not be direct: they may be mediated by files to which both users have read and write access [3]. One can conclude immediately from the analysis that the user system is naturally composed of two main groups. Furthermore, node 9 is most central to the yellow group, while node 13 is most central for the blue group. Finally, node 11 is a bridge node which is crucial for the flow of information between the two groups.

Suppose further that security for this small system is of interest. Then one can immediately identify nodes 9, 13, and 11 as most urgently needing protection from whatever threats the system faces. Nodes 9 and 13 are to be protected because they are centres of their regions: if they are infected, then there is a high probability that their entire region will also be infected.

Furthermore, one can give node 9 a higher priority for protection than node 13, since its region is larger. Finally, node 11 merits extra protection, since if it can be rendered immune to the threats, then these threats have no ready channel for spreading from one region to another.

Note that the use of Rule 2 does not single out any border nodes for special protection—even though node 11 clearly plays an important role in connecting the two regions. However, Rule 2 will identify the link between 11 and 13 as a bridge link. The obvious consequence of this is that the nodes on each end of each bridge link deserve special protective measures.

This problem can be turned on its head, by giving the administrator the problem of spreading desired information over this same small network. The analysis then suggests an efficient strategy for doing so: one starts with the centres (nodes 9 and 13), and arranges for the desired information to be broadcast from there.

It is of course to be expected that the distance rule and the steepest-ascent rule will give conflicting results for some nodes. An important point to be gleaned from FIGS. 2 through 7 is that the general qualitative picture is rather insensitive to the choice of rule for defining regions. One can expect this to be the case for most graphs. The choice of centres is independent of which rule is used; and these centres in turn exist precisely because they lie in a region of the graph that has some 'weight'—that is, some number of nodes which are better connected to one another than to their 'surroundings'. In short, the distinct rules, which ostensibly define regions, actually differ principally according to where they place the boundaries between regions-while the regions are in themselves rather stable objects.

Summary of the Definitions of Roles and Regions in Networks.

The basic criterion for defining a region (and its centre) has been well-connectedness, as measured by the 'smooth' graph function, eigenvector centrality or EVC. In addition to defining natural clusters of a graph, our approach also assigns a unique role to each node in the graph.

The two rules defining regions give qualitatively similar pictures for the graph structure as a whole, but rather different pictures in terms of which roles for nodes are present in the analysis.

That is, Rule 1—associating nodes with regions based purely on their distance, in shortest path hops, from centres—places a significant number of nodes in the border set. These nodes in turn can be placed in two distinct roles: bridge nodes, and danglers (see FIG. 2). Rule 2 holds more closely to the 'topographic' spirit of the approach as described within the present application, associating nodes with centres to which they are linked by a steepest-path ascent. This rule normally (in the absence of special symmetry) places no nodes in the border set-such that, with Rule 2, the two roles in the border set (bridge nodes and danglers) are essentially excluded, and all nodes are either centres of a region, or members of a region.

One can imagine other rules for defining regions. The principal aspect of the approach according to the present invention is to identify centres first, and then let regions 'grow' outwards from these centres. Both of the rules in accordance with the present invention fit this picture. The Girvan/Newman approach allows for a hierarchical decomposition of a graph, by breaking clusters into sub clusters, etc. A similar hierarchical decomposition could also be done according to the present invention, by eliminating border nodes and links, and applying the analysis according to the present invention to the resulting isolated regions. Further roles can be defined based on the present analysis methods. In a very simple example, one can assign the role of "Edge of the region" to those nodes which are connected to border elements (nodes or links). A different type of Edge role may be assigned to those nodes which are 'farthest' from the centre, but not linked to any border elements.

Applications.

In the following, there are given applications of the method and system according to the present invention. Clearly, both highly central nodes, and bridges (links or nodes) can be singled out as deserving extra attention and care in the preventing of the spread of damage. The highly central nodes are most likely to infect their regions; and the bridges in turn must be guarded so that the infection does not spread from one region to others. Hence it would be practical to immunize certain elements, and so ensure that any infection is isolated to a single region. For larger regions, it would also be practical to immunize the most central nodes in each region—prioritizing of course those regions with the greatest number of nodes. Some instances like very well-connected peer-to-peer systems, on the other hand, are hard to protect, because they are too well-connected. This means that there are many nodes in each region with roughly the same centrality, and that there are many bridges between regions (for those cases where there are more than one region).

The use of the system and method is applicable to many other types of graphs—in principle to any graph which is undirected. The method is easily modified—as described in the first embodiment—also to allow weights (other than 0 or 1) for the links between nodes. The method and system according to the present invention will prove to be useful in the analysis of social networks—which may (again) have a (positive) strength associated with each link.

When an innovation—a new product or service—is introduced into a population, the diffusion of the innovation follows a typical pattern. The innovation is usually discovered by a small group of early adopters, and after a while, depending on the early adopters' approval, the opinion leaders (or leading adopters) adopt the innovation. This is the critical point of the diffusion process, because the adoption of the innovation by the majority population usually depends on the acceptance of the opinion leaders [6]. In other words, adoption of an innovation takes off when the opinion leaders or social network hubs approve and adopt the innovation.

The method as disclosed by the embodiment and its accompanying examples of the present invention, uses a modified adjacency matrix, based on flow-data, to compute a centrality measure for each node in a social network. This centrality index allows the most central nodes of the social network that this adjacency matrix represents to be picked out. These nodes—the network hubs—are, in social network terms, opinion leaders. They are thus good targets for spreading of information etc., because they can potentially contribute to the acceleration of the diffusion of such information. An obvious application of the method is thus in the area of innovation diffusion.

In the introductory part references have been made to epidemiology, telecommunication, datacom, electric power systems etc. It can be added that the result of the analysis according to the present invention further has a wide range of applications. One example is planning of timetables within transport, or transmission and distribution systems. By analysing traffic flow in a network of roads or a railway system, the best timing for distribution could be found to avoid traffic congestion. Similarly, planning of traffic routing within telecom and datacom, as well as traffic planning on a more general basis, is an obvious application of the present invention, because the method easily can identify congestion points or good routes. Still further on a more microscopic level it can be used within design of computers, for analysing internal traffic and thereby optimising its components and its buses. The latter is particularly useful within the area of parallel processing, to reduce traffic between processors/computers.

Note that while in the foregoing, there has been provided a detailed description of the present invention, it is to be understood that equivalents are to be included within the scope of the invention as claimed. The detailed description has to a large extent dealt with the theory behind the present invention, however the use of these theories has a broad field of applications, provided the graphs are undirected.

Thus on a general basis the method according to the present invention is applicable within a wide area of fields and it can be applied for solving problems within these areas. Other advantageous embodiments of the present invention will be evident from the enclosed dependent claims.

ABBREVIATIONS AND REFERENCES

1. G. D. BATISTA, P. EADES, R. TAMASSIA, AND I. G. TOLLIS, *Graph Drawing: Algorithms for the Visualization of Graphs*, Prentice Hall, Upper Saddle River, N.J., 1999.
2. P. BONACICH, *Factoring and weighting approaches to status scores and clique identification*, Journal of Mathematical Sociology, 2 (1972), pp. 113-120.
3. M. BURGESS, G. CANRIGHT, AND K. ENGØ, *A graph theoretical model of computer security: from file access to social engineering*, International Journal of Information Security, (2003). submitted for publication.
4. G. CANRIGHT, K. ENGØ-MONSEN, AND Å. WELTZIEN, *Multiplex structure of the communications network in a small working group*, Social Networks—An International Journal of Structural Analysis, (2003). submitted for publication.
5. M. GIRVAN AND M. NEWMAN, *Community structure in social and biological networks*, Proc. Natl. Acad. Sci. USA, 99 (2002), pp. 8271-8276.
6. E. M. ROGERS, *Diffusion of Innovations*. Free Press, Fifth Edition, 2003.
7. J. M. KLEINBERG, *Authoritative sources in a hyperlinked environment*, Journal of the ACM, 46 (1999), pp. 604-632.
8. M. NEWMAN, *The structure and function of complex networks*, SIAM Review, 45 (2003), pp. 167-256.
9. A. Y. NG, A. X. ZHENG, AND M. I. JORDAN, *Stable algorithms for link analysis*, in Proc. 24th Annual Intl. ACM SIGIR Conference, ACM, 2001.
10. A. ORAM, ed., *Peer-to-peer: Harnessing the Power of Disruptive Technologies*, O'Reilly, Sebastopol, California, 2001.
11. L. PAGE, S. BRIN, R. MOTWANI, AND T. WINOGRAD, *The pagerank citation ranking: Bringing order to the web*, tech. report, Stanford Digital Library Technologies Project, 1998.
12. R. PASTOR-SATORRAS AND A. VESPIGNANI, *Epidemic spreading in scale-free networks*, Phys. Rev. Lett., 86 (2001), pp. 3200-3203.
13. T. H. STANG, F. POURBAYAT, M. BURGESS, G. CANRIGHT, K. ENGØ, AND Å. WELTZIEN, *Archipelago: A network security analysis tool*, in Proceedings of The 17$^{th}$ Annual Large Installation Systems Administration Conference (LISA 2003), San Diego, Calif., USA, October 2003.
14. G. H. GOLUB AND C. H. VAN LOAN, *Matrix Computations*. The Johns Hopkins University Press, Second Edition, 1989.

The invention claimed is:

1. A method of managing selected capabilities of an electronics communications network having a plurality of devices and network nodes interconnected by a set of undirected links, each link allowing information traffic of one or more specified media types, wherein a network node comprises one or more devices, the method comprising:
   (1) determining a role of each node in the communications network as either a centre node, a region member node, or a border node, and each border node as either a bridge node or a dangler node, by:
      a) assigning link strength values to each link in the network based on (i) a number of different media types supported by that link, (ii) a total amount of information traffic on that link over a given time interval, or (iii) a sum of fractions resulting from dividing an amount of information traffic of each media type by total information traffic on the network of that same media type;

b) organizing the assigned link strength values into an adjacency matrix representing the links between all pairs of nodes of the network, then computing a principle eigenvector of that adjacency matrix, the principle eigenvector providing a set of eigenvector centrality (EVC) indices representing connectedness for each node of the network;

c) identifying as a centre node of the network each node that corresponds to a local maximum of the EVC indices, each centre node having an associated network region of one or more nodes;

d) identifying as a region member node of a particular network region each node that may be uniquely associated according to an unambiguous rule with a single centre node, the unambiguous rule being selected from (i) a distance rule in which region members are closer in number of shortest path hops to an associated centre node than to any other centre node, or (ii) a steepest ascent rule in which region members have a steepest ascent path that will terminate at an associated centre node; and e) identifying as a border node between network regions each node for which the selected unambiguous rule gives more than one centre node, where the border nodes that lie on a non-self-retracing path between two centre nodes are further identified as bridge nodes, and all other border nodes are identified as dangler nodes; and (2) using the determined role of each node to manage any one or more of network robustness, network security, network communication efficiency, or control of spread of information through determined bridge nodes between network regions associated with the different centre nodes.

* * * * *